H. H. SCHMITT.
TRANSMISSION MECHANISM.
APPLICATION FILED FEB. 14, 1913.
1,112,843.
Patented Oct. 6, 1914.
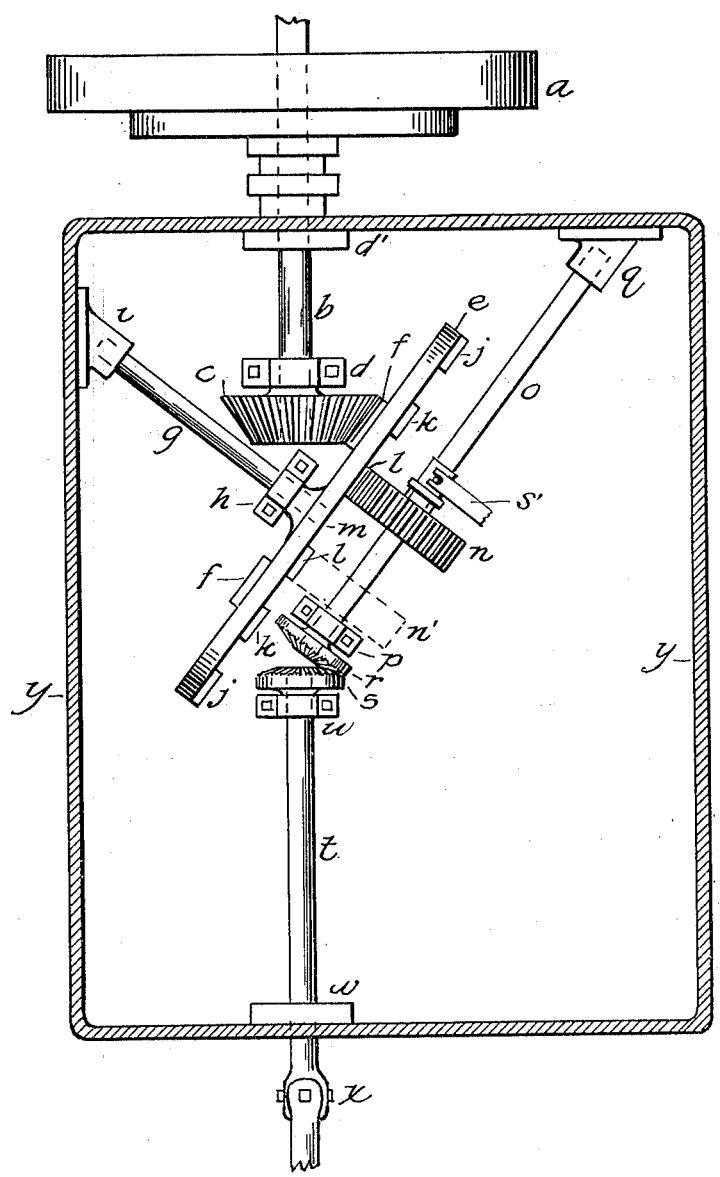
WITNESSES
INVENTOR
Herman H. Schmitt
BY
Walter B. Jones, ATTORNEY

UNITED STATES PATENT OFFICE.

HERMAN H. SCHMITT, OF CRESWELL, OREGON.

TRANSMISSION MECHANISM.

1,112,843.  Specification of Letters Patent.  Patented Oct. 6, 1914.

Application filed February 14, 1913. Serial No. 748,341.

*To all whom it may concern:*

Be it known that I, HERMAN H. SCHMITT, a citizen of the United States, residing at Creswell, in the county of Lane and State of Oregon, have invented a new and useful Improvement on Transmission Mechanism, of which the following is a specification.

This invention relates to certain new and useful improvements in transmission mechanism, and the primary object thereof is to provide novel, improved and simplified means for enabling the speed of a driven shaft to be varied during movement of the parts.

Further the invention aims to provide a compact structure in which the parts can be arranged in a small case.

The figure, in the drawings, is a horizontal sectional view of a case showing the invention in top plan view.

A case $y$, having square or rectangular lines has bearings $d$ and $d'$ in which a drive shaft $b$ is journaled, the outer end of the shaft $b$ extending through one end of the case and carrying a drive wheel $a$, while the inner end of the shaft $b$ has a bevel gear $c$ rigid thereon. A shaft $g$ which is diagonally related to the shaft $b$ has one end journaled in a bearing $i$ on one side of the case and has its other end journaled in a bearing $h$, and carries a disk $e$ on its inner end. A circular series of teeth $f$ on one face of the disk $e$ mesh with the gear $c$, while the opposite face of the disk $e$ has three circular series of teeth $j$, $k$, $l$ thereon. A diagonal shaft $o$ which is parallel to the disk $e$, is journaled in a bearing $q$ on one end of the case, and in a bearing $p$ adjacent the center of the case, and has a gear $n$ slidable thereon, but keyed thereto, the gear $n$ being slid along the shaft $o$ by the usual forked element (not shown) that may be actuated in any desired manner. Shaft $o$ has a miter gear $r$ rigid on its inner end, which gear $r$ meshes with a like gear $s$ on the inner end of a shaft $t$. The shaft $t$ is parallel with shaft $f$ and is journaled in a bearing $w$ on an end of the case and also in a bearing $u$ adjacent bearing $p$, the shaft $t$ being connected at $x$ to any suitable means for transferring power to the desired point.

In operation, power applied to shaft $b$ effects rotation of gear $c$ and therewith disk $e$, the latter in turn effecting rotation of gear $n$ and shaft $o$ at a speed according to whatever series of teeth $j$, $k$, $l$ that gear $n$ is in mesh with, the shaft $o$ in turn actuating shaft $t$ through the medium of the intermeshing gears $r$ and $s$.

When the gear $n$ is moved to neutral position, indicated at $m$ the gear $n$, shaft $o$, and shaft remain quiescent, and when the gear $n$ is moved to the dotted line position indicated at $n'$, the gear $n$ will be given reverse movement. A shipper rod $s'$ is connected to gear $n$ to shift same along the length of shaft $o$.

What is claimed is:

In a transmission mechanism, a casing having a driving and driven shaft associated therewith, said shafts being disposed in direct alinement, and having their opposing ends spaced apart, a bevel gear fixed to the inner end of the driving shaft, a miter gear fixed to the inner end of the driven shaft, a disk disposed in the space between the opposing ends of said shafts and in acute angular relation to the axes thereof, a ring of teeth on one face of said disk engaged with the bevel gear of the driving shaft, a plurality of concentric rings of teeth carried by the opposite face of the disk, a shaft arranged parallel with the disk, means carried by the last named shaft for engaging one ring of teeth of said plurality of rings of teeth at a time, and means carried by the last named shaft and engaged with the miter gear of the driven shaft to impart movement to the driven shaft upon rotation of the disk.

HERMAN H. SCHMITT.

Witnesses:
WALTER B. JONES,
GEORGIA BRODER.

Copies of this patent may be obtained for five cents each, by addressing the "Commissioner of Patents, Washington, D. C."